US009824013B2

United States Patent
Koob et al.

(10) Patent No.: US 9,824,013 B2
(45) Date of Patent: Nov. 21, 2017

(54) PER THREAD CACHELINE ALLOCATION MECHANISM IN SHARED PARTITIONED CACHES IN MULTI-THREADED PROCESSORS

(75) Inventors: Christopher Edward Koob, Round Rock, TX (US); Ajay Anant Ingle, Austin, TX (US); Lucian Codrescu, Austin, TX (US); Suresh K. Venkumahanti, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 13/466,359

(22) Filed: May 8, 2012

(65) Prior Publication Data

US 2013/0304994 A1  Nov. 14, 2013

(51) Int. Cl.
  *G06F 12/08* (2016.01)
  *G06F 12/0842* (2016.01)
  *G06F 12/0846* (2016.01)
  *G06F 12/0864* (2016.01)

(52) U.S. Cl.
  CPC ...... *G06F 12/0842* (2013.01); *G06F 12/0848* (2013.01); *G06F 12/0864* (2013.01)

(58) Field of Classification Search
  CPC ............ G06F 12/0842; G06F 12/0848; G06F 12/0864; G06F 12/128
  See application file for complete search history.

(56) References Cited

U.S. PATENT DOCUMENTS

| | | | | |
|---|---|---|---|---|
| 6,078,994 A | * | 6/2000 | Carey | 711/133 |
| 6,223,256 B1 | * | 4/2001 | Gaither | G06F 12/126 |
| | | | | 711/118 |
| 6,381,676 B2 | * | 4/2002 | Aglietti | G06F 12/128 |
| | | | | 711/126 |
| 6,421,761 B1 | * | 7/2002 | Arimilli | G06F 12/0848 |
| | | | | 711/128 |
| 6,493,800 B1 | * | 12/2002 | Blumrich | 711/129 |

(Continued)

FOREIGN PATENT DOCUMENTS

| CN | 101286138 A | 10/2008 |
|---|---|---|
| CN | 101609432 A | 12/2009 |

(Continued)

OTHER PUBLICATIONS

International Search Report and Written Opinion—PCT/US2013/040040—ISA/EPO—Aug. 20, 2013.

(Continued)

*Primary Examiner* — Hal Schnee
(74) *Attorney, Agent, or Firm* — QUALCOMM INCORPORATED

(57) ABSTRACT

Systems and methods for allocation of cache lines in a shared partitioned cache of a multi-threaded processor. A memory management unit is configured to determine attributes associated with an address for a cache entry associated with a processing thread to be allocated in the cache. A configuration register is configured to store cache allocation information based on the determined attributes. A partitioning register is configured to store partitioning information for partitioning the cache into two or more portions. The cache entry is allocated into one of the portions of the cache based on the configuration register and the partitioning register.

20 Claims, 5 Drawing Sheets

(56) References Cited

U.S. PATENT DOCUMENTS

| | | | |
|---|---|---|---|
| 6,604,174 B1* | 8/2003 | Dean | G06F 12/0844 |
| | | | 711/118 |
| 6,681,296 B2 | 1/2004 | Liao et al. | |
| 6,694,407 B1 | 2/2004 | May et al. | |
| 6,795,845 B2 | 9/2004 | Kalafatis et al. | |
| 6,871,264 B2 | 3/2005 | Soltis, Jr. | |
| 7,039,760 B2 | 5/2006 | Arimilli et al. | |
| 2003/0196041 A1 | 10/2003 | Sturges et al. | |
| 2005/0102486 A1* | 5/2005 | Lakshmanamurthy et al. | 712/1 |
| 2008/0195849 A1* | 8/2008 | Gonzalez et al. | 712/223 |
| 2008/0235457 A1* | 9/2008 | Hasenplaugh et al. | 711/130 |
| 2009/0089546 A1* | 4/2009 | Lakshmanamurthy et al. | 712/203 |
| 2009/0157968 A1* | 6/2009 | Bell et al. | 711/128 |
| 2010/0318742 A1* | 12/2010 | Plondke et al. | 711/123 |
| 2011/0078381 A1* | 3/2011 | Heinrich et al. | 711/122 |

FOREIGN PATENT DOCUMENTS

| | | |
|---|---|---|
| EP | 0856797 A1 | 8/1998 |
| JP | H10232834 A | 9/1998 |
| JP | H1196074 A | 4/1999 |
| JP | 2002342163 A | 11/2002 |
| JP | 2007065743 A | 3/2007 |

OTHER PUBLICATIONS

Qiao et al.,"Main-Memory Scan Sharing for MultiCore CPUs", PVLDB '08, Auckland, New Zealand, VLDB Endowment, ACM 978-1-60558-305, pp. 610-621(Aug. 23-28, 2008).

* cited by examiner

200

| CP | Cache Allocation |
|----|------------------|
| 00 | Use data attributes to determine allocation |
| 01 | Main portion |
| 10 | Auxiliary portion |

PER THREAD CACHELINE ALLOCATION MECHANISM IN SHARED PARTITIONED CACHES IN MULTI-THREADED PROCESSORS

FIELD OF DISCLOSURE

Disclosed embodiments are directed to cache allocation in shared caches. More particularly, exemplary embodiments are directed to allocation of cache lines in shared partitioned caches in multi-threaded processors.

BACKGROUND

The manifestation of multi-threading in processors may occur at different levels or at differing degrees of process granularity. The various threads of a multi-threaded processor may share one or more levels of caches and memory. The threads may have different data attributes like "streaming data," "localized data," "multiple-use data," "shared," "non-shared," etc. Simple allocation and replacement schemes like least recently used (LRU) are unsuitable because the different contexts created by the threads and data attributes specific to threads must be accounted for.

For example, in the absence of specialized allocation/replacement mechanisms, cache lines of a shared cache that have been populated by streaming data may be replaced by localized data or multiple-use data of another thread. Such scenarios are unacceptable and may lead to severe degradation of processing speed and efficiency.

Some shared caches may include a static partitioning to keep data from different threads separate. However, with static partitioning, the threads get statically locked to a particular cache partition, which leads to additional drawbacks. For example, a data attribute of a thread may dynamically transition from streaming data to localized data or vice-versa. As can be seen, static partitioning that locks threads too allocate in predefined portions of a cache, cannot account for such dynamic transitions of data attributes in threads.

Accordingly, there is a need in the art for flexible cache allocation in shared caches which avoid the aforementioned drawbacks.

SUMMARY

Exemplary embodiments of the invention are directed to systems and method for allocation of cache lines in shared partitioned caches for multi-threaded.

For example, an exemplary embodiment is directed to a method of updating a shared cache comprising: receiving an address for a cache entry associated with a processing thread to be allocated in the cache; determining attributes associated with the address; setting a configuration register corresponding to the processing thread, with cache allocation information based on the attributes; determining a cache partition based on a partitioning register; and allocating the cache entry in the cache based on the configuration register and the cache partition.

Another exemplary embodiment is directed to a method of cache allocation in a multi-threaded processing system comprising: receiving an address associated with data, for a processing thread of the multi-threaded processing system, to be allocated in the cache; determining page attributes associated with the address; partitioning the cache into two or more portions; and allocating the data into one or more portions of the cache based at least on the page attributes.

Yet another exemplary embodiment is directed to a multi-threaded processing system comprising: a cache; a processing thread; a memory management unit for determining attributes associated with an address for a cache entry associated with the processing thread to be allocated in the cache; a configuration register comprising cache allocation information based on the determined attributes; a partitioning register comprising partitioning information for partitioning the cache into two or more portions; and logic for allocating the cache entry into one of the portions of the cache based on the configuration register and the partitioning register.

Yet another exemplary embodiment is directed to a multi-threaded processing system comprising a cache; a processing thread; memory management means for determining attributes associated with an address for a cache entry associated with the processing thread to be allocated in the cache; configuration means for storing cache allocation information based on the determined attributes; partitioning means for storing partitioning information for partitioning the cache into two or more portions; and means for allocating the cache entry into one of the portions of the cache based on the configuration means and the partitioning means.

Yet another exemplary embodiment is directed to a non-transitory computer-readable storage medium comprising code, which, when executed by a multi-threaded processor, causes the multi-threaded processor to perform operations for updating a shared cache, the non-transitory computer-readable storage medium comprising: code for receiving an address for a cache entry associated with a processing thread to be allocated in the cache; code for determining attributes associated with the address; code for setting a configuration register with cache allocation information based on the attributes; code for determining a cache partition; and code for allocating the cache entry in the cache based on the configuration register and the cache partition.

Yet another exemplary embodiment is directed to a non-transitory computer-readable storage medium comprising code, which, when executed by a multi-threaded processor, causes the multi-threaded processor to perform operations for cache allocation in a multi-threaded processing system, the non-transitory computer-readable storage medium comprising: code for receiving an address associated with data, for a processing thread of the multi-threaded processing system, to be allocated in the cache; code for determining page attributes associated with the address; code for partitioning the cache into two or more portions; and code for allocating the data into one or more portions of the cache based at least on the page attributes.

BRIEF DESCRIPTION OF THE DRAWINGS

The accompanying drawings are presented to aid in the description of embodiments of the invention and are provided solely for illustration of the embodiments and not limitation thereof.

FIG. 2 illustrates a table comprising configuration register settings for cache allocation.

DETAILED DESCRIPTION

Figure 1:
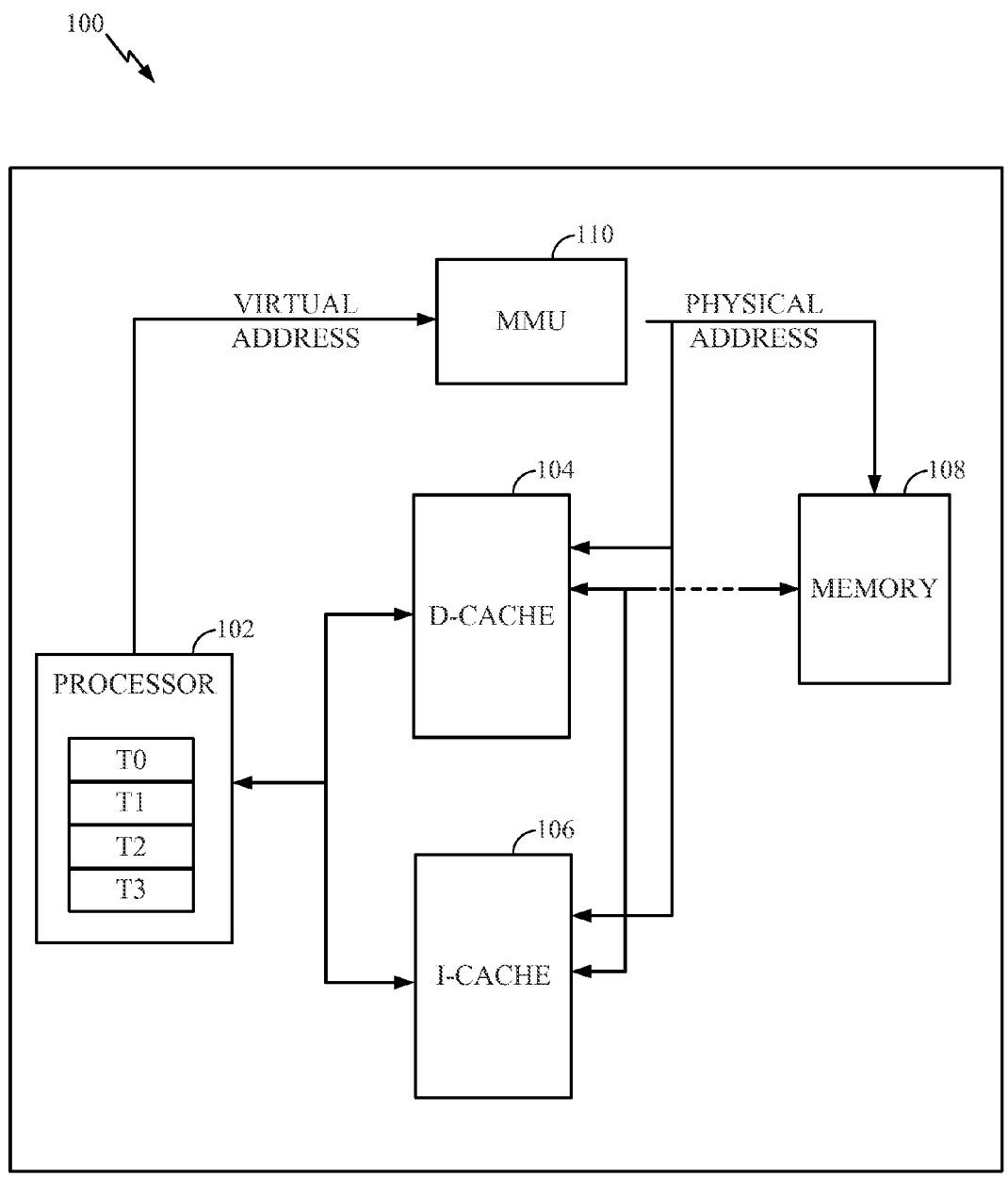
FIG. 1 is a block diagram of processing system 100 configured to implement cache partition and cache allocation according to exemplary embodiments.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments are suitable for multi-threaded processors with shared caches. Embodiments may be configured to allow flexible allocation of data in partitioned caches. In some embodiments, software can control allocation of data in a statically partitioned cache by overriding the static partition, and allocating data into a partition determined by software. In other words, software may allocate date in the entire cache, without being subjected to statically defined partitions of the cache that may be, for example, thread specific.

With reference now to FIG. 1, a schematic representation of processing system 100 is illustrated. Multi-threaded processor 102 may be configured to process two or more threads (e.g., threads T0, T1, T2, and T3), which may be implemented in hardware or software. The two or more threads may access L1 caches such as D-cache 104 and I-cache 106 which may be partitioned according to exemplary embodiments discussed herein. One or more levels of caches, such as L2 cache (not shown) may also be present in the memory hierarchy of processor 100, culminating in shared main memory 108. Memory management unit (MMU) 110 may be in communication with the various caches and main memory to serve functions such as address translation from virtual addresses generated by multi-threaded processor 102 to physical address for accessing the caches and main memory 108. Suitable variations of processing system 100 will be recognized by skilled persons, without deviating from the scope of disclosed embodiments.

Cache allocation in exemplary embodiments will now be described with reference to D-cache 104, without loss of generality. D-cache 104 may be partitioned in various ways in order to control placement of data within the cache space according to particular needs. For example, D-cache 104 may be partitioned into a main portion and an auxiliary portion. The main portion may be dedicated to data processing needs of threads from multi-threaded processor 102, while the auxiliary portion may be dedicated to streaming data which may be received for example from a direct memory access (DMA) engine (not shown). The relative or absolute sizes and placements of the main and auxiliary portions may be set statically. For example, the cache may be statically partitioned into main and auxiliary portions in a selected ratio, such as, 50:50, 25:75, 75:25, etc. In other words, in terms of ways of the cache, the cache partitioning may specify the number of ways in a main and auxiliary portion. For example, for an 8-way cache, the cache partitioning may specify 6 ways in the main and 2 ways in the auxiliary portion (corresponding to a 75:25 proportion). In some embodiments, the cache partitioning may be dynamic. For example, the relative proportions of the main and auxiliary portions may be based on the processing threads.

Exemplary embodiments may include a configuration register per thread of multi-threaded processor 102, wherein the configuration register may control cache allocation corresponding to the thread. The configuration register may be set by software. Each thread may have associated data attributes such as page attributes associated with addresses of data in the thread. These data attributes may be used to determine allocation of data in D-cache 104.

With reference now to FIG. 2, a table comprising cache allocation directives for a first thread (e.g. running on multi-threaded processor 102) based on the first thread's configuration register CP 200 is illustrated. As shown, in a first mode wherein CP 200 is set to a value of "00" the allocation/placement of data in D-cache 104 is controlled by associated data attributes. For example, in the first mode, any statically determined allocation of data to defined partitions of D-cache 104 will be ignored and the data attributes will dictate where data will be placed. In other words, in this first mode, regardless of how D-cache 104 is partitioned into particular proportions of main and auxiliary portions, these partitions may be ignored, and the data may be allocated into any portion of the entire D-cache 104 based on the data attributes. In some embodiments MMU 110 may be configured to assist in the cache allocation by parsing the address associated with the data for data attributes and using these attributes to set the configuration register CP accordingly.

With continuing reference to table 200 of FIG. 2, in a second mode wherein CP 200 is set to a value of "01," any static determination of allocation of data to partitions of D-cache 104 will be ignored and the data will be allocated to a main portion of D-cache 104. Similarly, in a third mode wherein CP 200 is set to a value of "10," any static determination of allocation of data to partitions of D-cache 104 will be ignored and the data will be allocated to an auxiliary portion of D-cache 104. While only three modes are shown in the table of FIG. 2, additional modes may be defined by adding more bits to CP 200 if required. For example, another mode could designate "no allocation" wherein allocation of the associated data in D-cache 104 is skipped and the data is treated as uncached. Yet another mode could designate a "most recently used (MRU)" allocation, wherein the data is allocated to the portion (e.g. main or auxiliary) which was most recently used for data allocation in D-cache 104 for the first thread. One of ordinary skill will recognize suitable variations of the above-described modes based on setting a configuration register for particular implementations.

Figure 3:
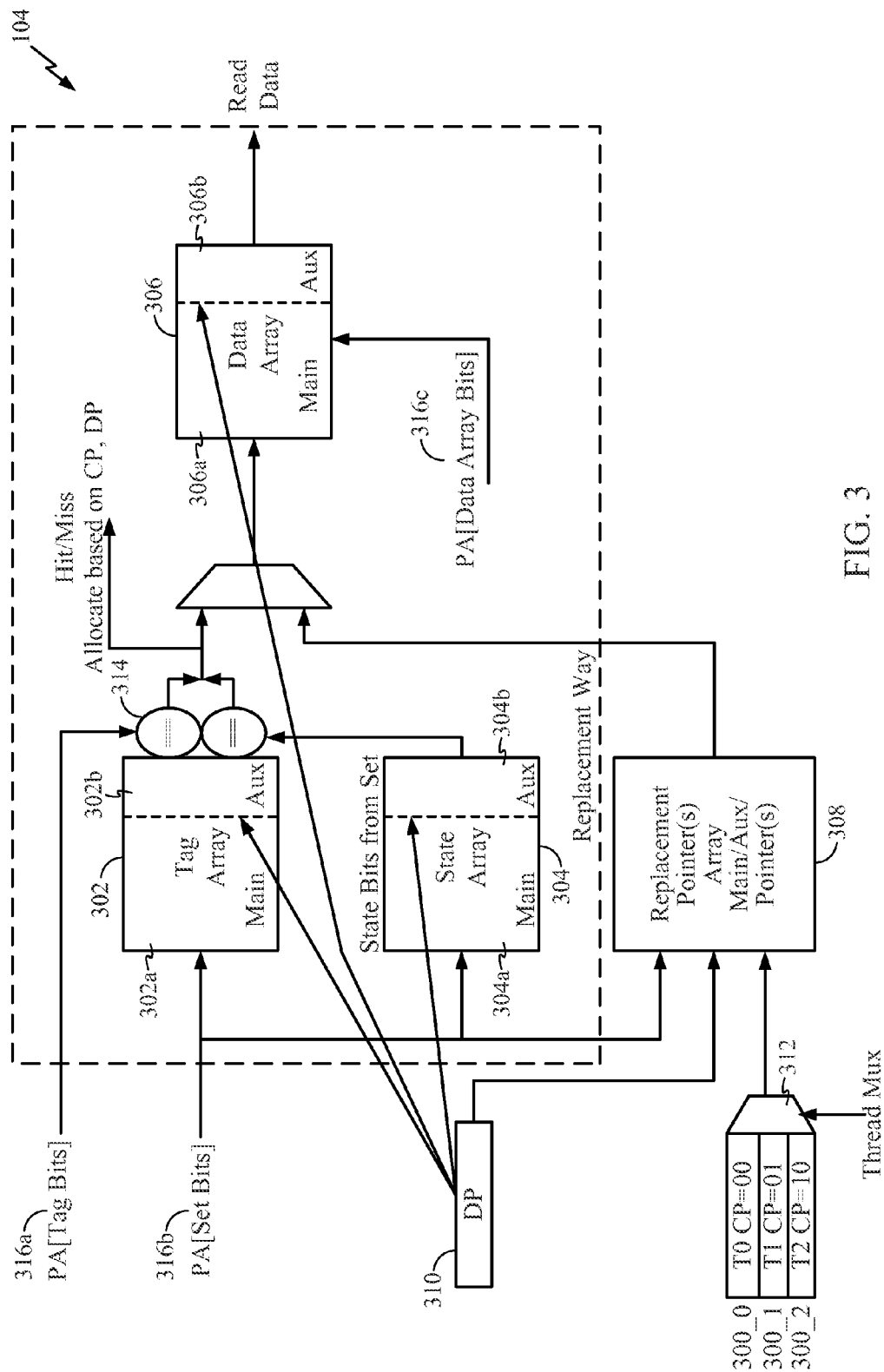
FIG. 3 illustrates a schematic diagram of a logical implementation of cache allocation and cache partition in an exemplary data cache.

Referring now to FIG. 3, an exemplary implementation of allocation of D-cache 104 using thread specific configuration registers is illustrated. Three configuration registers CP 300_0, 300_1 and 300_2 are shown, corresponding to threads T0, T1, and T2 respectively. Also as shown, an expanded view of D-cache 104 comprises tag array 302, state array 304, and data array 306. D-cache partitioning register DP 310 configured to control partitioning across tag array 302, state array 304, and data array 306 of D-cache 104 will now be discussed in further detail.

D-cache partitioning register DP 310 may be configured to hold specific partitioning information for D-cache 104. In one example, a static partition of D-cache 104 may be implemented and DP 310 may be set with information pertaining to relative proportions of main and auxiliary portions of D-cache 104. For example, DP 310 may be set as part of system configuration of processing system 100. The static partitioning may be common to each processing thread, or may be thread-specific. Specific static partitions may be selected by a programmer. In another example, D-cache 104 may be dynamically partitioned in a thread specific manner. Combinations of static and dynamic partitions are also possible and may be implemented by suitably configuring partitioning register DP 310.

Regardless of whether statically or dynamically partitioned, the specific partitioning indicated by DP 310 may be used to partition tag array 302 into main tag array portion 302a and auxiliary tag array portion 302b. Similarly, state array 304 may be partitioned into main state array portion 304a and auxiliary state array portion 304b; and data array 306 may be partitioned into main data array portion 306a and auxiliary data array portion 306b.

A general mechanism of writing data to D-cache 104 will now be described. Physical address (PA) of data which needs to be allocated in D-cache 104 may be parsed into tag bits, PA [tag bits] 316a, PA [set bits] 316b, and PA [data array bits] 316c. PA [tag bits] 316a may be compared against tags present in tag array 302 (which may be implemented as a content addressable memory (CAM)) using comparators 314. Comparators 314 may also validate a positive result (hit) with corresponding state bits read out from state array 304 using PA [set bits] 316b to ensure that the hitting tag array entry is valid. On the other hand, if there is a miss, and D-cache 104 needs to be allocated, then replacement way logic 308 may assist in allocating the entry in data array 306 corresponding to the PA, by taking into account modes of configuration register CP.

With continuing reference to FIG. 3, an exemplary cooperation of thread specific configuration registers CP 300_0, 300_1 and 300_2 with the above described mechanism of writing to D-cache 104 will now be explained. As illustrated, for a selected thread of the three threads, T0, T1, and T2, thread mux 312 may be configured to select between configuration registers CP 300_0, 300_1 and 300_2 corresponding to the selected thread. In a first example, it will be assumed that the data with physical address PA belongs to thread T0. Correspondingly, thread mux 312 will select configuration register CP 300_0 which is shown to hold the value "00." As previously described, this corresponds to the first mode, wherein existing partitioning of D-cache 104 will be ignored and allocation of D-cache 104 will be based on data attributes. Accordingly, following the above-described mechanism of writing to D-cache 104, if there is a miss, replacement way logic 308 will assist in writing data into main data array portion 306a or auxiliary data array portion 306b at an allocated location derived from PA [data array bits] 316c, and overriding any allocation which may be determined by partitioning information derived from DP 310.

In a second example, the data may belong to thread T1, thus causing thread mux 312 to select configuration register CP 300_1 which has been shown to hold the value "01". As previously described, this value corresponds to the second mode, wherein the data will be allocated to the main portion of D-cache 104. The location of the main portion within D-cache 104 will be determined based on DP 310. Accordingly, following the above-described mechanism of writing to D-cache 104, on a miss, data will be written to main data array portion 306a at a location derived from PA [data array bits] 316c.

In a third example, the data may belong to thread T2, thus causing thread mux 312 to select configuration register CP 300_2, which has been shown to hold the value 10". As previously described, this value corresponds to the third mode, wherein the data will be allocated to the auxiliary portion of D-cache 104. The location of the auxiliary portion within D-cache 104 will be determined based on DP 310. Accordingly, following the above-described mechanism of writing to D-cache 104, on a miss, data will be written to auxiliary data array portion 306b at a location derived from PA [data array bits] 316c.

Thus, in exemplary embodiments, D-cache 104 may be statically partitioned. The subsequent allocation of the data may be controlled by appropriately setting the corresponding configuration register CP, based on attributes. One of ordinary skill will understand that the disclosed techniques can be easily extended to I-cache 106 or any other cache, such as an L2 cache. Correspondingly, cache allocation may be for any suitable cache entry such as a cache line or a cache block comprising data or instructions. Regardless of the specific partitions or allocation modes, the fine grained control of allocation of data/instructions in exemplary embodiments, may improve management of shared caches in software, and thereby improve performance of processing system 100.

Figure 4:
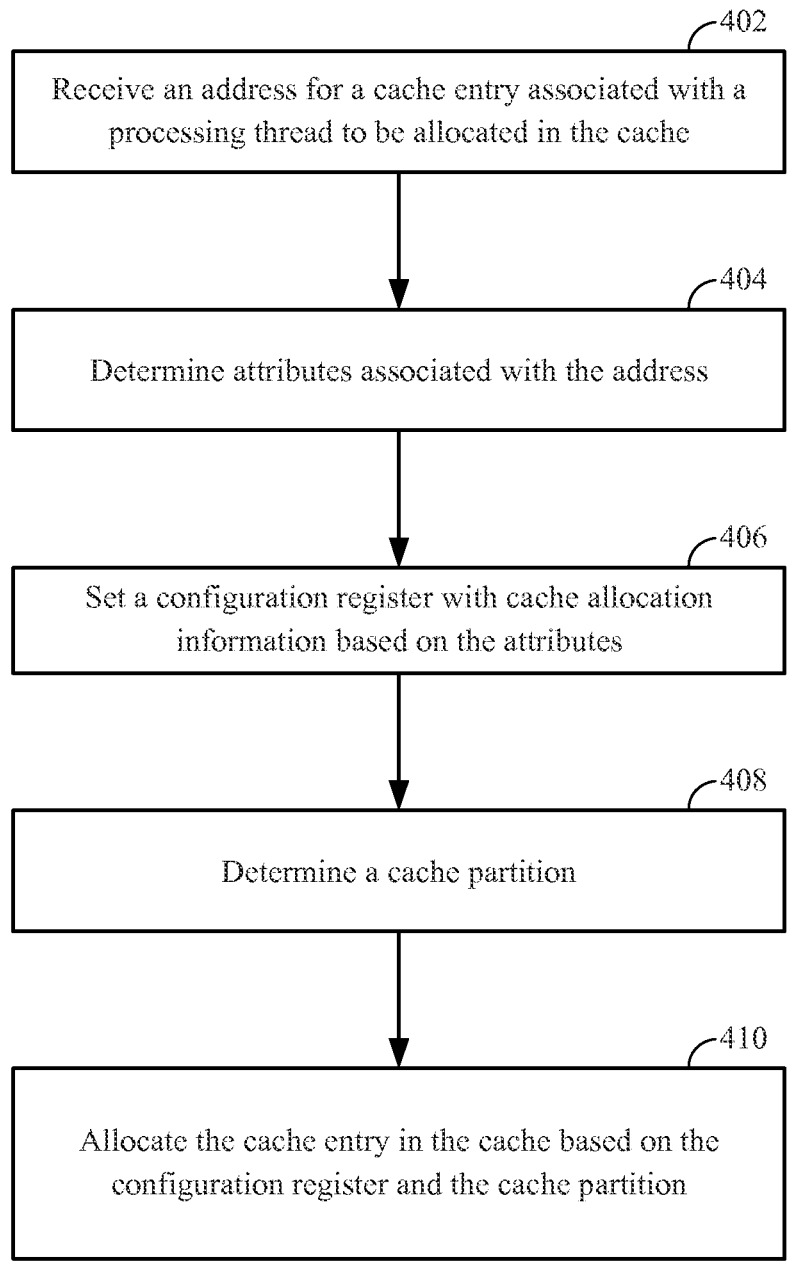
FIG. 4 illustrates an exemplary operational flow of a method of allocating a cache according to exemplary embodiments.

It will be appreciated that embodiments include various methods for performing the processes, functions and/or algorithms disclosed herein. For example, as illustrated in FIG. 4, an embodiment can include a method of updating a cache comprising: receiving an address for a cache entry associated with a processing thread to be allocated in the cache (e.g. PA for data associated with thread T0 in FIG. 2)—Block 402; determining attributes (e.g. page attributes) associated with the address—Block 404; setting a configuration register with cache allocation information based on the attributes (e.g. configuration register CP for thread T0 in FIG. 2)—Block 406; determining a cache partition based on a partitioning register (e.g. DP 310)—Block 408; and allocating the cache entry in the cache (e.g. into main or auxiliary portion) based on the configuration register and the cache partition—Block 410.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Figure 5:
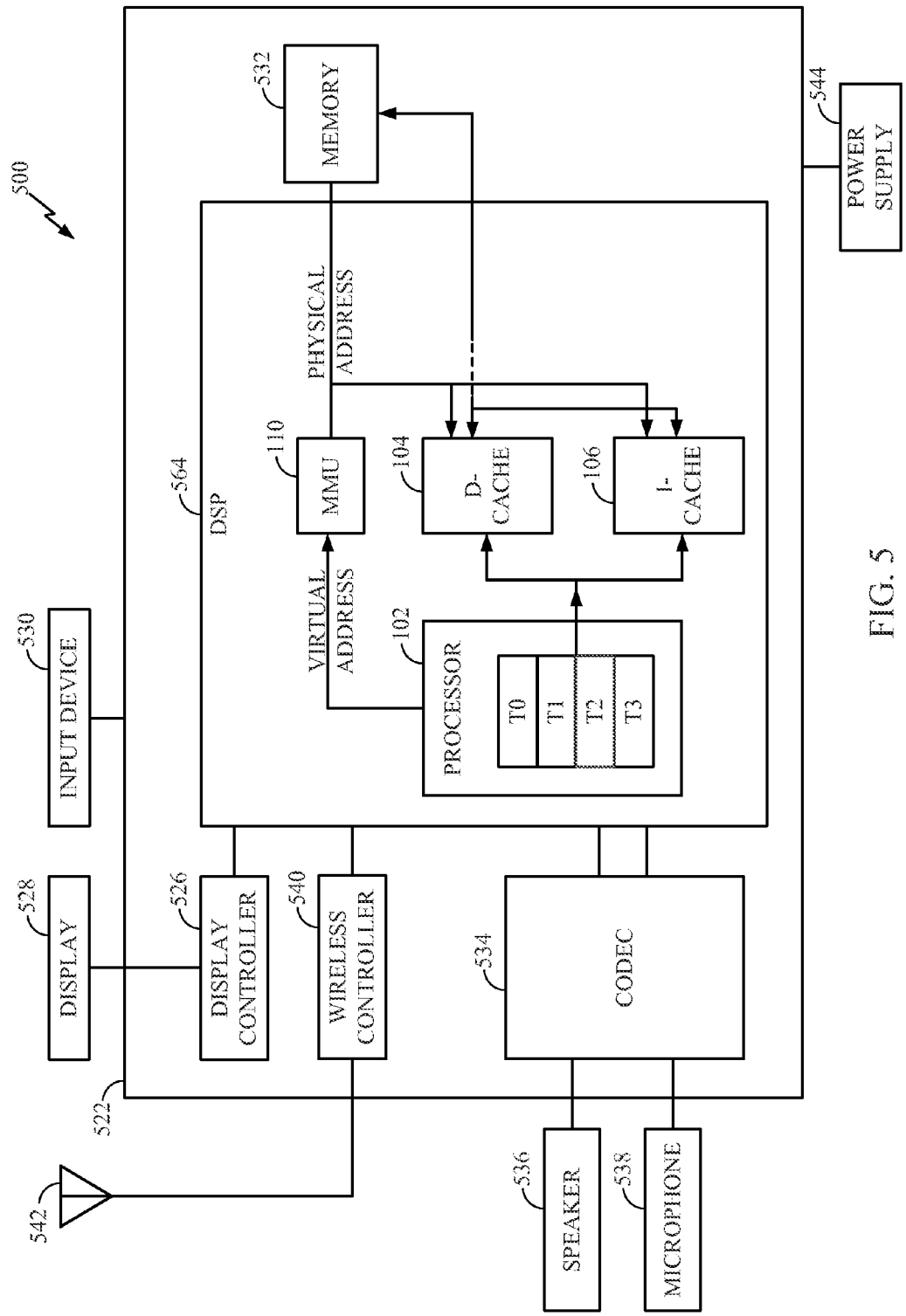
FIG. 5 is a block diagram of a particular illustrative embodiment of a wireless device that includes a multi-core processor configured according to exemplary embodiments.

Referring to FIG. 5, a block diagram of a particular illustrative embodiment of a wireless device that includes a multi-core processor configured according to exemplary embodiments is depicted and generally designated 500. The device 500 includes a digital signal processor (DSP) 564, which may include various blocks illustrated in FIG. 1, such as, processor 102, MMU 110, D-Cache 104, and I-Cache 106 coupled to memory 532 as shown. FIG. 5 also shows display controller 526 that is coupled to DSP 564 and to display 528. Coder/decoder (CODEC) 534 (e.g., an audio and/or voice CODEC) can be coupled to DSP 564. Other components, such as wireless controller 540 (which may include a modem) are also illustrated. Speaker 536 and microphone 538 can be coupled to CODEC 534. FIG. 5 also indicates that wireless controller 540 can be coupled to wireless antenna 542. In a particular embodiment, DSP 564, display controller 526, memory 532, CODEC 534, and wireless controller 540 are included in a system-in-package or system-on-chip device 522.

In a particular embodiment, input device 530 and power supply 544 are coupled to the system-on-chip device 522. Moreover, in a particular embodiment, as illustrated in FIG. 5, display 528, input device 530, speaker 536, microphone 538, wireless antenna 542, and power supply 544 are external to the system-on-chip device 522. However, each of display 528, input device 530, speaker 536, microphone 538, wireless antenna 542, and power supply 544 can be coupled to a component of the system-on-chip device 522, such as an interface or a controller.

It should be noted that although FIG. 5 depicts a wireless communications device, DSP 564 and memory 532 may also be integrated into a set-top box, a music player, a video player, an entertainment unit, a navigation device, a personal digital assistant (PDA), a fixed location data unit, or a computer. A processor (e.g., DSP 564) may also be integrated into such a device.

Accordingly, an embodiment of the invention can include a computer readable media embodying a method for cache allocation. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of updating a cache shared between two or more processing threads of a multi-threaded processor, the method comprising:
   receiving an address for a cache entry associated with a processing thread of the two or more processing threads to be allocated in the cache;
   determining attributes associated with the address;
   setting a configuration register corresponding to the processing thread with cache allocation information based on the attributes, wherein two or more configuration registers comprise cache allocation information related to the two or more processing threads respectively;
   determining a default cache partition between a main portion and an auxiliary portion, based on a partitioning register;
   determining from the configuration register corresponding to the processing thread, a mode in which the default cache partition will be ignored; and
   allocating the cache entry in the cache based on the configuration register for the processing thread, while ignoring the default cache partition.

2. The method of claim 1, wherein the attributes are page attributes.

3. The method of claim 1, wherein the attributes indicate one of streaming data, localized data, multiple-use data, shared, or non-shared.

4. The method of claim 1, comprising setting the partitioning register during system configuration of a system comprising the cache.

5. The method of claim 1, further comprising: configuring a memory management unit (MMU) for determining the attributes associated with the address.

6. The method of claim 5 further comprising configuring the MMU to set the configuration register with cache allocation information based on the attributes.

7. The method of claim 1, wherein the cache allocation information indicates one of a cache allocation based on the attributes, cache allocation to a main portion, or cache allocation to an auxiliary portion.

8. The method of claim 1, wherein the main portion is dedicated to data processing needs of the two or more processing threads and the auxiliary portion is dedicated to streaming data.

9. A method of cache allocation in a multi-threaded processing system, the method comprising:
receiving an address associated with data, for a processing thread of two or more processing threads of the multi-threaded processing system, to be allocated in a cache;
determining page attributes associated with the address;
partitioning the cache into a main portion and an auxiliary portion based on a default cache partition;
determining from the page attributes, a mode in which the default cache partition will be ignored; and
allocating the data into one or more portions of the cache based on the page attributes and cache allocation information provided by a thread specific configuration register corresponding to the processing thread, while ignoring the default cache partition.

10. The method of claim 9, wherein partitioning the cache is based on a static partition.

11. The method claim 10, wherein the static partition is determined by configuration information for a system comprising the cache.

12. The method of claim 11, wherein the static partition is commonly determined for all processing threads of the multi-threaded processing system.

13. The method of claim 12, wherein the static partition is individually determined for each processing thread of the multi-threaded processing system.

14. The method of claim 9, wherein the main portion is dedicated to data processing needs of the two or more processing threads and the auxiliary portion is dedicated to streaming data.

15. A multi-threaded processing system comprising:
a cache shared between two or more processing threads of the multi-threaded processing system;
a memory management unit to determine attributes associated with an address for a cache entry associated with a processing thread of the two or more processing threads to be allocated in the cache;
two or more configuration registers corresponding to the two or more processing threads, the two or more configuration registers comprising cache allocation information for the corresponding processing threads based on the determined attributes;
a partitioning register comprising a default cache partition of the cache into a main portion and an auxiliary portion;
a thread mux configured to select a mode for the processing thread wherein the default cache partition will be ignored; and
logic to allocate the cache entry into one of the portions of the cache based on the cache allocation information provided by a configuration register corresponding to the processing thread but independent of the default cache partition provided by the partitioning register.

16. The multi-threaded processing system of claim 15, wherein the attributes are page attributes.

17. The multi-threaded processing system of claim 15, wherein the cache allocation information indicates one of a cache allocation based on page attributes, cache allocation to a main portion, or cache allocation to an auxiliary portion.

18. The multi-threaded processing system of claim 15, wherein the main portion is dedicated to data processing needs of the two or more processing threads and the auxiliary portion is dedicated to streaming data.

19. A multi-threaded processing system comprising:
a cache shared between two or more processing threads of the multi-threaded processing system;
means for determining attributes associated with an address for a cache entry associated with a processing thread of the two or more processing threads to be allocated in the cache;
two or more means for storing cache allocation information based on the determined attributes, each of the two or more means for storing corresponding to one of the two or more processing threads;
means for storing a default cache partition of the cache into a main portion and an auxiliary portion;
means for determining a mode in which the default cache partition will be ignored for the processing thread; and
means for allocating the cache entry based on the means for storing cache allocation information for the processing thread but independent of the default cache partition.

20. A non-transitory computer-readable storage medium comprising code, which, when executed by a multi-threaded processor, causes the multi-threaded processor to perform operations for updating a cache shared between two or more processing threads of the multi-threaded processor, the non-transitory computer-readable storage medium comprising:
code for receiving an address for a cache entry associated with a processing thread of the two or more processing threads to be allocated in the cache;
code for determining attributes associated with the address;
code for setting a configuration register corresponding to the processing thread with cache allocation information based on the attributes, wherein two or more configuration registers comprise cache allocation information related to the two or more processing threads respectively;
code for determining a default cache partition between a main portion and an auxiliary portion;
code for determining from the configuration register corresponding to the processing thread, a mode in which the default cache partition will be ignored; and
code for allocating the cache entry in the cache based on the configuration register for the processing thread while ignoring the default cache partition.

* * * * *